United States Patent [19]

Stark et al.

[11] 4,115,517

[45] Sep. 19, 1978

[54] TREATMENT OF SULFUR OXIDES WITH AQUEOUS GLYOXYLIC ACID SOLUTIONS

[75] Inventors: William H. Stark, Cincinnati, Ohio; Cheng-Hsien Chu, Etobicoke, Canada

[73] Assignee: Spring Chemicals Limited, Toronto, Canada

[21] Appl. No.: 717,082

[22] Filed: Aug. 24, 1976

[51] Int. Cl.² .......................... C01B 17/00; C01F 1/00
[52] U.S. Cl. ...................................... 423/243; 423/166
[58] Field of Search ................. 423/242, 243, 244, 166

[56] References Cited

U.S. PATENT DOCUMENTS 3,350,165   10/1967   Marcheguet et al. ............... 423/243

FOREIGN PATENT DOCUMENTS 443,314   2/1936   United Kingdom ..................... 423/243
538,602   8/1941   United Kingdom ..................... 423/243

Primary Examiner—O. R. Vertiz
Assistant Examiner—Gregory A. Heller
Attorney, Agent, or Firm—Burns, Doane, Swecker & Mathis

[57] ABSTRACT

Sulfuric acid or absorbed sulfur trioxide in aqueous glyoxylic acid solutions may be removed by contacting the aqueous glyoxylic acid solutions with a barium compound such as barium hydroxide which is substantially inert to the glyoxylic acid but which precipitates barium sulfate from the aqueous glyoxylic acid solution. In a preferred embodiment, aqueous glyoxylic acid solution is used to absorb sulfur dioxide and sulfur trioxide from industrial flue gases and the absorbed sulfur dioxide being removed from the aqueous glyoxylic acid solution by stripping and the absorbed sulfur trioxide being removed from the stripped glyoxylic acid solution by precipitation as barium sulfate.

8 Claims, 1 Drawing Figure

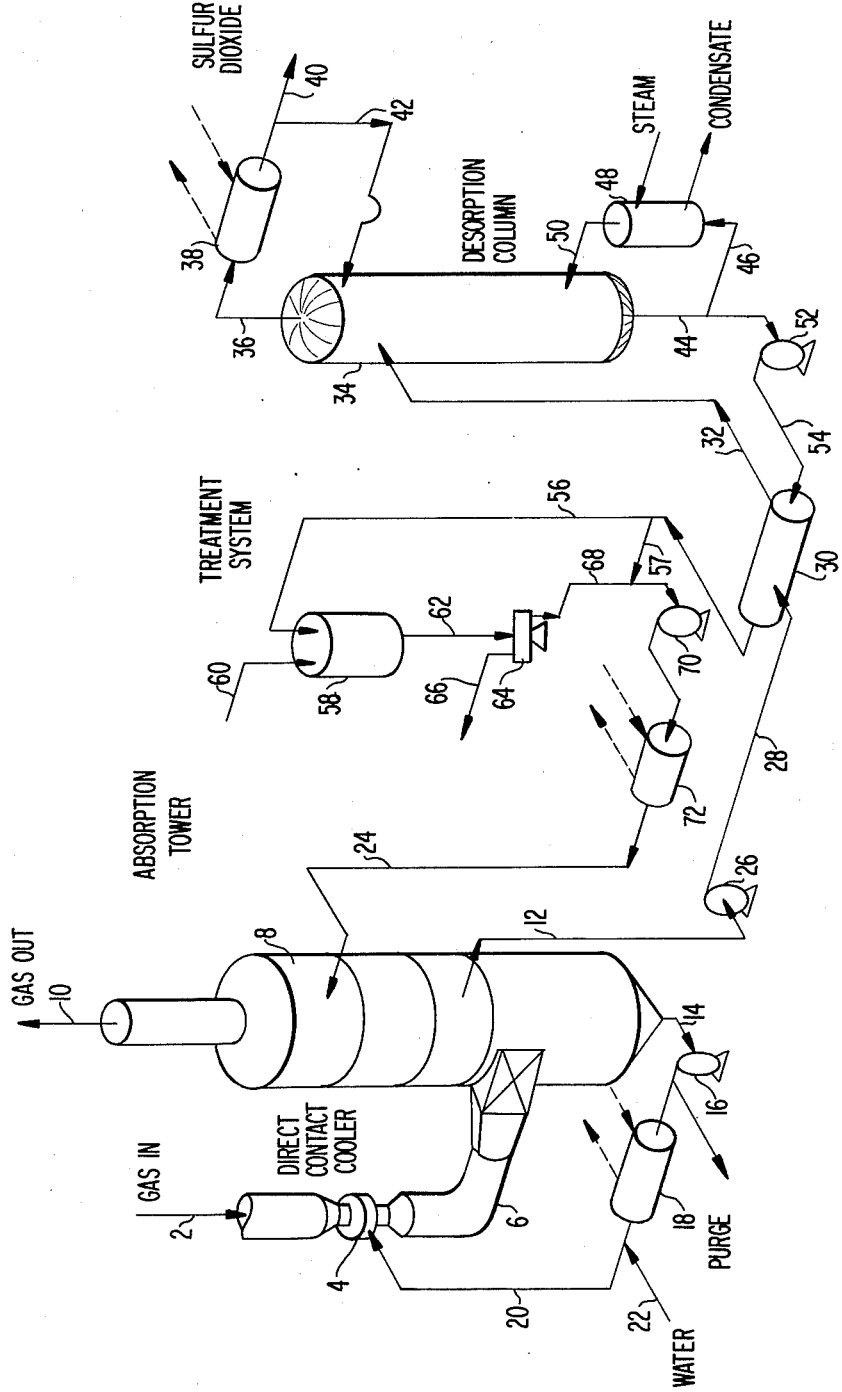

TREATMENT OF SULFUR OXIDES WITH AQUEOUS GLYOXYLIC ACID SOLUTIONS

BACKGROUND OF THE INVENTION

1. Field of the Invention

This invention relates to the treatment of aqueous glyoxylic acid solutions. More particularly, this invention relates to processes for the removal of sulfuric acid or absorbed sulfur trioxide from aqueous glyoxylic acid solutions, and to processes for the removal of sulfur dioxide and sulfur trioxide from industrial flue gases using aqueous glyoxylic acid solution as an absorbent.

2. Summary of the Prior Art

The use of sulfur-containing fossil fuels as power sources results in effluent gases containing a number of noxious environmental pollutants, among which are sulfur dioxide and to a lesser extent sulfur trioxide. Similarly, tail gases from sulfuric acid production processes also contain objectionable amounts of sulfur dioxide and sulfur trioxide. A host of solutions to this problem has been proposed. The non-regenerative methods involve absorbing and/or reacting the sulfur oxides with inorganic reagents, e.g. alkaline carbonates or hydroxides, in slurry or solution to yield the corresponding sulfite and sulfate salts. Such non-regenerative gas treating systems, however, are characterized by high costs due to the continuing chemical consumption and the high transportation costs required for continually bringing the chemicals to the plant site and the disposal costs for continually removing the sludge formed. See, for example, U.S. Pat. No. 3,632,306.

Other general methods suggested for the selective removal of sulfur dioxide and sulfur trioxide from effluent gases utilize absorbents which can be regenerated, surch regeneration offering significant advantages economically over non-regenerative processes.

Such regenerative absorbent systems include inorganic systems such as sodium solution processes and magnesium slurry processes. Regenerative organic bases, e.g. amines, have also been suggested as absorbents. See, for example, U.S. Pat. Nos. 3,047,364 and 3,904,735. A different class of absorbent has also been proposed, namely aqueous solutions of glyoxylic acid. See, for example, U.S. Pat. No. 3,350,165. It will be noted that this U.S. Pat. No. 3,350,165 states that aqueous solutions of glyoxylic acid perform, in addition to a good absorbent role for sulfur dioxide, the role of an oxidation inhibitor with respect to the sulfur dioxide, such that the formation of sulfuric acid is inhibited. Even so, it has been found that, because most industrial flue gases containing sulfur dioxide also contain sulfur trioxide, that sulfur trioxide is also absorbed by the aqueous glyoxylic acid solution, thus in fact creating sulfuric acid in the system. The sulfuric acid remains in the aqueous glyoxylic acid solution after stripping of the sulfur dioxide from the aqueous glyoxylic acid solution. Unless removed, the concentration of sulfuric acid in the absorbent will increase to an intolerable level, causing corrosion of the equipment and degradation of absorbent.

SUMMARY OF THE INVENTION

Accordingly, a primary object of the present invention is to provide novel processes for preventing or substantially alleviating the problems of the prior art as discussed above.

Another more particular object of the present invention is to provide a process for the removal of sulfuric acid or absorbed sulfur trioxide from aqueous glyoxylic acid solutions.

Another more particular object of the present invention is to provide novel processes for the removal of sulfur dioxide and sulfur trioxide from industrial gases.

In accordance with one aspect of the present invention, a process is provided for the removal of sulfuric acid or absorbed sulfur trioxide from aqueous glyoxylic acid solutions, which process involves contacting aqueous glyoxylic acid solution containing sulfuric acid or absorbed sulfur trioxide with a barium compound more soluble than barium sulfate in the glyoxylic acid solution, the barium compound being substantially inert to the glyoxylic acid and being present in an amount effective to precipitate barium sulfate from the aqueous glyoxylic acid solution, and removing the barium sulfate precipitate from the aqueous glyoxylic acid solution.

In another aspect of the present invention, a process is provided for the extraction of sulfur dioxide and sulfur trioxide from gases containing sulfur dioxide and sulfur trioxide, which process involves contacting the gas with an aqueous solution of glyoxylic acid to absorb sulfur dioxide and sulfur trioxide in the aqueous solution, removing the sulfur dioxide from the aqueous glyoxylic acid solution by heating to strip the sulfur dioxide as a vapor from the aqueous glyoxylic acid solution, and thereafter removing absorbed sulfur trioxide by contacting the aqueous glyoxylic acid solution with an inorganic barium compound such as barium hydroxide or barium carbonate, the barium compound being essentially inert to the glyoxylic acid and being present in an amount effective to precipitate barium sulfate from the aqueous glyoxylic acid solution.

In another aspect of the present invention, a process is provided for the removal of sulfur dioxide and sulfur trioxide from hot industrial effluent gases for discharge to the atmosphere, which process consists essentially of:

(a) passing industrial gas at a temperature between about 70° C and about 250° C and containing from about 0.2% to about 2% sulfur dioxide and from about 0.002% to about 0.1% sulfur trioxide to a cooling zone to cool the gas to a temperature between about 30° C and about 40° C;

(b) passing the cool gas through an absorber at a temperature between about 30° C and about 40° C and in countercurrent contact with an absorbent composition stream consisting essentially of from about 10% to about 25% glyoxylic acid and correspondingly from about 90% to about 75% water;

(c) absorbing sulfur dioxide and sulfur trioxide in the absorbent composition;

(d) heating the absorbent composition containing absorbed sulfur dioxide and sulfur trioxide to a temperature of between about 60° C and about 80° C;

(e) passing the heated absorbent composition to a stripping zone and stripping sulfur dioxide as a vapor from the absorbent stream;

(f) removing from the stripping zone stripped aqueous glyoxylic acid solution consisting essentially of about 0.5% to about 2% sulfuric acid, about 1% to about 3% absorbed sulfur dioxide, about 10% to about 25% glyoxylic acid and from about 90% to about 70% water;

(g) contacting the stripped aqueous glyoxylic acid solution containing the sulfuric acid with barium hydroxide, the barium hydroxide being essentially inert to the glyoxylic acid and being present in an amount such that the molar ratio of barium ion in solution to sulfate ion in solution is between about 0.7 and about 0.9:1 and effective to precipitate essentially only barium sulfate from the aqueous glyoxylic acid solution;

(h) centrifuging the barium sulfate precipitate from the aqueous glyoxylic acid solution; and (i) passing aqueous glyoxylic acid solution having the barium sulfate separated therefrom to the absorber of step (a) above.

A central feature of the present invention is the discovery of the unique selectivity of barium compounds such as barium hydroxide to selectively remove through precipitation essentially all sulfate ion from aqueous solutions of glyoxylic acid which may contain not only sulfuric acid but also some absorbed sulfur dioxide. Such selectivity is surprising in view of, for example, calcium compounds such as calcium hydroxide which at about room temperature will not precipitate sulfate ion as calcium sulfate from such aqueous glyoxylic acid solutions. Moreover, it was thought that strongly alkaline materials may precipitate not only sulfate but also sulfite, glyoxylate or glyoxylate-containing compounds, for the mechanism by which glyoxylic acid solution retains sulfur oxides remains somewhat obscure.

Other objects, aspects and advantages of the present invention will become apparent to one skilled in the art in view of the following description of the preferred embodiments, when read in conjunction with the drawing.

BRIEF DESCRIPTION OF THE DRAWING

The drawing is a schematic perspective view of a preferred embodiment of an absorbent-regenerative process for removing sulfur dioxide and sulfur trioxide from an industrial gas.

DESCRIPTION OF THE PREFERRED EMBODIMENTS

As indicated above, the present invention involves removal of sulfuric acid or absorbed sulfur trioxide from aqueous glyoxylic acid solutions. Such aqueous glyoxylic acid solutions may contain varying amounts of glyoxylic acid, sulfuric acid, water and minor amounts of other non-interfering constituents including absorbed sulfur dioxide. For example, such aqueous glyoxylic acid solutions may comprise from about 5% to about 50%, and more typically from about 10% to about 25% glyoxylic acid and from about 0.05% to about 10%, more typically from about 0.2% to about 2% sulfuric acid. Although in a preferred embodiment the sulfuric acid is present mainly through absorption of sulfur trioxide, other sources of sulfuric acid in aqueous glyoxylic acid solutions are also contemplated.

As noted above, the aqueous glyoxylic acid solution may contain sulfur trioxide absorbed from gases, particularly industrial gases such as tail gases from sulfuric acid production, or industrial effluent or flue gases from sulfur-containing fossil fuel burning power plants or stack gases from other industrial operations. For example, such industrial gases may contain from about 0.02% to about 20%, more typically about 0.1% and about 5%, and even more typically from about 0.2% to about 2% sulfur dioxide, and from about 0.001% to about 1%, more typically from about 0.002% to about 0.1%, sulfur trioxide. The remaining gases are typically at least one selected from the group consisting of oxygen, nitrogen, oxides of nitrogen, oxides of carbon, and mixtures thereof, including water vapor.

A barium compound which is more soluble than barium sulfate in the glyoxylic acid solution and which is substantially, or essentially inert to the glyoxylic acid, is used to precipitate barium sulfate from the above described aqueous glyoxylic acid solutions. The term "substantially, or essentially inert" is used herein to mean that the barium compound does not precipitate or degrade the glyoxylic acid or strongly complex the glyoxylic acid so as to destroy or substantially lessen the sulfur dioxide absorbing properties. Of course, if barium carbonate is used, the acidic nature of the aqueous solution will cause the carbonate ion to break down into carbon dioxide and water. Such barium compounds include inorganic barium salts such as barium hydroxide and barium carbonate. Barium chloride may also be used, particularly if chloride ion is subsequently removed as by conventional ion-exchange techniques. Barium hydroxide is particularly preferred insofar as it will form a ready precipitate which may be conveniently removed by decantation, centrifuge or filtration.

The barium compound is typically contacted with the aqueous glyoxylic acid solution in amounts of barium compound effective to precipitate barium sulfate from the aqueoud glyoxylic acid solution. The molar ratio of barium to sulfate ion solution may vary widely, although a significant excess of barium may not be desired in so far as it would remain in the glyoxylic acid solution. For example, molar ratios of barium to sulfate ion in solution may vary from about 0.1:1 to about 2:1, more typically from about 0.5:1 to about 1:1, and preferably from about 0.7:1 to about 0.9:1.

The barium compound may be contacted with the glyoxylic acid at any convenient temperature. For example, the barium compound may be contacted with the glyoxylic acid at temperatures of from above the freezing point to the boiling temperature, which may vary depending upon pressure and particular composition of the solution. More typically, temperatures may be from about 20° C to about 80° C, and preferably from about 30° C to about 50° C.

Atmospheric, superatmospheric or subatmospheric pressures may be used, with atmospheric pressure being convenient. Also, the barium compound may be contacted with the glyoxylic acid in a stirred or non-stirred reactor or reaction zone, and on a continuous, semi-continuous or batch basis.

Generally, the process for removing sulfur oxides from gases involves an absorption-desorption technique. See, for example, U.S. Pat. No. 3,350,165, which is incorporated herein by reference.

In a preferred embodiment of the present invention, an overall process for the removal of sulfur dioxide and sulfur trioxide from industrial gases may involve (referring to the drawing) passing industrial gas in a conduit or line 2 at a temperature between about 50° C and about 1000° C to a cooling zone 4 to cool the industrial gas to a temperature between about 30° C and about 40° C. The cooling zone 4 may comprise a direct contact cooler wherein cooling water may be passed or admixed directly into the hot gas. The cold gas may then be passed through a line 6 to an absorption zone 8, typically in countercurrent contact, with an absorbent composition stream consisting essentially of the aqueous glyoxylic acid solution. This absorption zone is maintained at a temperature and pressure profile such that the sulfur dioxide and sulfur trioxide will be absorbed by a countercurrent glyoxylic acid solution fed to the absorber 8 via a line 24. Such liquid-gas countercurrent absorption operations are, in general, well-known. See, for example, Perry's Chemical Engineers Handbook, 4th Edition (McGraw Hill 1969), which is incorporated herein by reference for purposes of brevity and clarity. Industrial gas having sulfur oxides removed therefrom are passed out of the top of the absorber 8 via a line 10. Water may be removed from the bottom of the absorber 8 via a line 14 and a pump 16 and recycled back to the cooler 4 via a line 20. Make-up water may be added as needed via a line 22. After absorption, the absorbent composition may then be passed from the absorber 8 via a line 12 and a pump 26 to a countercurrent heat exchanger 30 for heating to a temperature between about 60° C and about 80° C. The heated stream may then be passed via a line 32 to a stripping or desorption zone or unit 34, so that sulfur dioxide may be stripped as a vapor from the absorbent stream. Suitable temperature and pressure profiles within the stripping zone will be within the skill of one skilled in the art in view of the present specification. Typically, such temperatures vary from about 80° C under slight vacuum to about 105° C at about atmospheric pressure. See, also, for example, U.S. Pat. No. 3,350,165 incorporated by reference above. From the desorption column 34 water vapor and sulfur dioxide gas may be passed via line 36 to a water-cooled condenser 38, with sulfur dioxide gas then being recovered via line 40 and water being recycled via line 42 to the column 34. The stripped aqueous glyoxylic acid solution when removed from the stripping zone 34 via a line 44 may consist essentially of 0.05% to about 2% sulfuric acid, about 1% to about 3% absorbed sulfur dioxide, about 10% to about 25% glyoxylic acid and from about 90% to about 70% water. A portion of this stream may be passed via line 46 to a reboiler 48 and via a line 50 back to the column 34. This stripped aqueous glyoxylic acid solution via a pump 52 and a line 54 may be paassed through the heat exchanger 30 for cooling to between about 30° C and about 50° C, and then to a treatment tank 58. The stripped solution in the treatment tank 58 is then contacted or admixed with barium hydroxide, preferably barium hydroxide in solid particulate form. The barium hydroxide may be added to the tank 58 via a line 60.

Upon precipitation in the tank 58, the barium sulfate may be removed from the aqueous glyoxylic acid solution by passing the solution and precipitate via a line 62 to a centrifuge 64, with the precipitate being removed via line 66 from the centrifuge 64. The aqueous glyoxylic acid solution having the barium sulfate separated therefrom may be passed via a line 68, a pump 70 and a line 24 back to the initial absorption zone 8. If desired, a portion of the stripped solution may bypass the treatment tank 58 and via a line 57 be passed directly to the absorption zone. If treatment tank 58 is operated on a semicontinuous or batch basis, then all of the stripped solution may be passed via line 57 directly to the absorption zone. A heat exchanger 72 may be provided to cool the glyoxylic acid solution to a temperature between about 30° C and about 40° C.

The present invention is further illustrated by the following examples all parts and percentage in the examples as well as in the other parts of the specification and claims are by weight (except that the percentages of components in industrial gases given above are by volume and on a dry basis) or unless otherwise specified.

EXAMPLES 1-9

Aqueous solutions (A) containing twenty percent glyoxylic acid, HOOC-CHO, were prepared by mixing at about 25° C 240 parts by weight of fifty percent aqueous glyoxylic acid and 360 parts by weight water. Aqueous solutions (B) containing twenty percent glyoxylic acid and absorbed sulfur dioxide were prepared by bubbling at about 25° C sulfur dioxide gas through 400 parts of the twenty percent glyoxylic acid solutions (A) until the total weight of solution with absorbed sulfur dioxide was about 410 parts. To the solutions (B) containing the glyoxylic acid and absorbed sulfur dioxide was added sulfuric acid at levels of 0.5%, 1% and 2% (Solutions C). Various barium compounds were then added to solutions A, B and C above by admixing the compounds in solid particulate form at about 35° C and at a mole ratio of Ba:$SO_4$ of about 0.9:1 until all of the barium compounds dissolved. For solutions A and B, no precipitation was observed. For solution C, immediate heavy precipitates of barium sulfate were observed. The precipitates were filtered from the glyoxylic acid solution and dried at 105° C for 10 hours and then ignited at 870° C. Other data and results are shown in the table below.

The oven dried and the ignited precipitate weights are all somewhat higher than the expected yield based on the sulfuric acid content and the barium addition. Ignition losses were from 3.5 to 9.1%. These differences may be attributable in part to experimental error and in part to the formation of other barium compounds.

| Ex. No. | Solution "B" | $H_2SO_4$ Addition | Barium Addition Compound, 100% Basis | | $BaSO_4$ Precipitate (105° C/10 hr.) | (ignited at 870° C) |
| --- | --- | --- | --- | --- | --- | --- |
| | gm | gm | | gm | gm | gm |
| 1 | 50.0 | 0.50 | Ba(OH)$_2$.8H$_2$O | 1.547 | 1.228 | 1.180 |
| 2 | 50.0 | 0.25 | " | 0.773 | 0.674 | 0.644 |
| 3 | 50.0 | 1.00 | " | 3.094 | 2.467 | 2.380 |
| 4 | 50.0 | 0.25 | BaCO$_3$ | 0.483 | (1) | (1) |
| 5 | 50.0 | 0.50 | " | 0.965 | 1.706 | 1.551 |
| 6 | 50.0 | 1.00 | " | 1.932 | (1) | (1) |
| 7[2] | 49.5 | 1.00 | Ba(OH)$_2$.8H$_2$O | 0.951 | 0.934[2] | 0.885 |
| 8[2] | 49.5 | 0.50 | " | 1.547 | 1.221[2] | 1.167 |
| 9 | 49.0 | 1.00 | BaCl$_2$ | (1) | (1) | (1) |

[1] Not weighed
[2] Slight amount of Ba(OH)$_2$.8H$_2$O may not have dissolved; also, solution B for these two runs was boiled for 106 hours at atmospheric pressure prior to treatment with the barium compound.

As a comparison, it should be noted that a run corresponding to Example 9 was made except that calcium hydroxide was used instead of barium chloride. The calcium hydroxide dissolved, but no precipitate was observed.

The foregoing reveals the gist of the present invention and specific embodiments thereof so that others of ordinary skill in this art may use various adaptations thereof which should and are intended to be comprehended within the meaning and range of equivalents of the following claims.

We claim:

1. A process for the extraction of sulfur dioxide and sulfur trioxide from gases containing sulfur dioxide and sulfur trioxide, which process comprises contacting the gas with an aqueous solution of glyoxylic acid to absorb sulfur dioxide and sulfur trioxide in said aqueous solution, removing the sulfur dioxide from the aqueous glyoxylic acid solution by heating to strip the sulfur dioxide as a vapor from the aqueous glyoxylic acid solution, and thereafter removing absorbed sulfur trioxide by contacting the aqueous glyoxylic acid solution with a barium compound selected from the group consisting of barium hydroxide and barium carbonate, the barium compound being essentially inert to the glyoxylic acid and being present in an amount effective to precipitate barium sulfate from the aqueous glyoxylic acid solution.

2. A process according to claim 1 wherein the barium compound is barium hydroxide and wherein the barium hydroxide is contacted with the aqueous glyoxylic acid solution at a temperature between about 20° C and about 80° C.

3. A process according to claim 1 wherein the aqueous glyoxylic acid solution contains between about 5% and 50% glyoxylic acid, and between about 0.05% and about 10% sulfuric acid and wherein the barium compound is present in an amount such that the molar ratio of barium ion to sulfate ion in solution is between about 0.5:1 and 1:1.

4. A process according to claim 1 wherein the barium compound is barium carbonate, and wherein the barium carbonate is contacted with the aqueous glyoxylic acid solution at a temperature between about 20° C and about 80° C.

5. A process for the removal of sulfur dioxide and sulfur trioxide from industrial gases, which process comprises: p1 (a) passing the industrial gas at a temperature between about 30° C and about 40° C through an absorption zone in counter-current contact with an absorbent composition stream consisting essentially of from about 10% to about 25% glyoxylic acid and correspondingly from about 90% to about 75% water;
(b) absorbing sulfur dioxide and sulfur trioxide in said absorbent composition;
(c) passing the absorbent composition containing absorbed sulfur dioxide and absorbed sulfur trioxide as sulfuric acid to a stripping zone and stripping absorbed sulfur dioxide from the absorbent solvent stream;
(d) removing from the stripping zone stripped aqueous glyoxylic acid solution containing sulfuric acid;
(e) contacting the stripped glyoxylic acid solution containing the sulfuric acid with barium hydroxide, the barium hydroxide being essentially inert to the glyoxylic acid and being present in an amount effective to precipitate barium sulfate from the aqueous glyoxylic acid solution;
(f) removing the barium sulfate precipitate from the aqueous glyoxylic acid solution; and
(g) passing the aqueous glyoxylic acid solution having the barium sulfate removed therefrom to the absorption zone of step (a) above.

6. A process according to claim 5 wherein the barium hydroxide is added to the aqueous glyoxylic acid solution in solid particulate form.

7. A processing according to claim 5 wherein, after step (d) and before step (e), the stripped absorbent solution is cooled to a temperature below about 80° C.

8. A process for the removal of sulfur dioxide and sulfur trioxide from industrial gases, which process consists essentially of:
(a) passing industrial gas at a temperature between about 50° C and about 1000° C containing from about 0.2% to about 2% sulfur dioxide and from about 0.002% to about 0.1% sulfur trioxide to a cooling zone to cool the gas to a temperature between about 30° C and 40° C;
(b) passing the cooled gas at a temperature between about 30° C and about 40° C through an absorber in countercurrent contact with an absorbent composition stream consisting essentially of from about 10% to about 25% glyoxylic acid and correspondingly from about 90% to about 75% water;
(c) absorbing sulfur dioxide and sulfur trioxide in the absorbent composition;
(d) heating the absorbent composition containing absorbed sulfur dioxide and absorbed sulfur trioxide as sulfuric acid to a temperature between about 60° C and about 80° C;
(e) passing the absorbent composition to a stripping zone and at a temperature between about 80° C and about 105° C stripping sulfur dioxide as a vapor from the absorbent stream;
(f) removing from the stripping zone stripped aqueous glyoxylic acid solution consisting essentially of about 0.5% to about 2% sulfuric acid, about 1% to about 3% absorbed sulfur dioxide, about 10% to about 25% glyoxylic acid and from about 90% to about 70% water;
(g) contacting the stripped aqueous glyoxylic acid solution containing the sulfuric acid with barium hydroxide, the barium hydroxide being essentially inert to the glyoxylic acid and being present in an amount such that the molar ratio of barium ion in solution to sulfate ion in solution is between about 0.7:1 and about 0.9:1 and effective to precipitate essentially only barium sulfate from the aqueous glyoxylic acid solution;
(h) centrifuging the barium sulfate precipitate from the aqueous glyoxylic acid solution; and
(i) passing aqueous glyoxylic acid solution having the barium sulfate separated therefrom to the absorber of step (a) above.

* * * * *